United States Patent [19]

Watabe et al.

[11] 4,437,177
[45] Mar. 13, 1984

[54] SMALL-SIZED VIDEO OR AUDIO PICKUP DEVICE HAVING A BEAM DEFLECTOR DISPOSED WITHIN A FOCUSING DEVICE SUPPORT

[75] Inventors: Akinori Watabe, Yokohama; Susumu Yonezawa, Yokosuka; Yoshiharu Tanaka, Omiya, all of Japan

[73] Assignees: Nippon Telegraph & Telephone Public Corporation, Tokyo; Mansei Kogyo Kabushiki Kaisha, Saitama, both of Japan

[21] Appl. No.: 206,382

[22] Filed: Nov. 12, 1980

[30] Foreign Application Priority Data

Nov. 12, 1979 [JP] Japan ................................. 54-145462
Nov. 12, 1979 [JP] Japan ............................ 54-155838[U]

[51] Int. Cl.³ .............................................. G11B 7/08
[52] U.S. Cl. ......................................... 369/45; 369/44
[58] Field of Search ................................. 369/43–46, 369/109–111; 250/201, 202, 204, 239, 570; 358/127–132

[56] References Cited

U.S. PATENT DOCUMENTS

| | | |
|---|---|---|
| 3,924,063 | 12/1975 | Simons . |
| 4,004,081 | 1/1977 | Zorn ........................................ 369/44 |
| 4,092,529 | 5/1978 | Aihara et al. .......................... 369/45 |
| 4,135,206 | 1/1979 | Kleuters et al. ....................... 369/44 |
| 4,193,091 | 3/1980 | Kleuters et al. . |
| 4,321,701 | 3/1982 | Arquie et al. .......................... 369/45 |

FOREIGN PATENT DOCUMENTS

| | | |
|---|---|---|
| 2652701 | 5/1977 | Fed. Rep. of Germany . |
| 1251851 | 11/1971 | United Kingdom . |
| 1421586 | 1/1976 | United Kingdom . |
| 1503162 | 3/1978 | United Kingdom . |
| 1515177 | 6/1978 | United Kingdom . |
| 1570593 | 7/1980 | United Kingdom . |

*Primary Examiner*—Raymond F. Cardillo, Jr.
*Attorney, Agent, or Firm*—Oblon, Fisher, Spivak, McClelland & Maier

[57] ABSTRACT

A small-sized video or audio reading pickup device in which a light beam generator generates a light beam directed to a focussing device which focuses the light beam into a beam spot on an information carrier. The focussing device is mounted on an upper portion of a cylindrical hollow support disposed in a resiliently supported frame and a beam deflecting mirror is fixedly mounted within the cylindrical hollow support and independently thereof in vertical alignment with the focussing device. A light beam generated by the beam generating device is laterally directed to and deflected off the deflecting mirror and focused via the focussing device onto the information carrier, with the vertical positioning of the cylindrical hollow support being controlled to control the size of the beam spot. Lateral positioning of the light beam on the carrier is also controlled by lateral translation of the frame, and a photosensitive detector is arranged to detect light beam intensity reflected from the carrier.

26 Claims, 14 Drawing Figures

SMALL-SIZED VIDEO OR AUDIO PICKUP DEVICE HAVING A BEAM DEFLECTOR DISPOSED WITHIN A FOCUSING DEVICE SUPPORT

The present invention relates to an apparatus for reading a disc-shaped information carrier on which information, for example, video and/or audio information, is recorded in an optically readable structure, and more particularly, to a pickup device for such an apparatus comprising, generally, a light beam generating means for generating a light beam, a focussing unit having a focussing lens for focussing the light beam emerged from a light beam generating means onto the plane of the information carrier and a focus controlling means for controlling the positional relation between the focussing lens and the information carrier, and a photo-sensitive signal detector for converting the modulated light beam at the plane of the information carrier into electrical signals.

Hitherto, various attempts have been made to miniaturize the pickup devices of the above-mentioned construction. However, in the known pickup device, each of the light beam generated by the beam generating means is introduced into the focussing unit through the bottom of it. Therefore, the vertical length (thickness) of the pickup device becomes necessarily large. Further, each of the optical elements used therein require fixing means and the construction of the pickup device becomes complicated and bulky.

To eliminate the above-mentioned disadvantage and also to simplify the construction, in the pickup device according to the present invention, a beam deflecting means is disposed within the focussing unit with particular arrangements as described below and the focussing unit is so constructed that the light beam is introduced in it through the lateral side thereof.

It is therefore an object of the present invention to produce a simple and small-sized pickup device for use in the video and/or audio readout apparatus.

Other objects, advantages, and features of the invention will be apparent from the following detailed description of the preferred embodiments thereof when read in connection with the attached drawings, in which.

Figure 1:
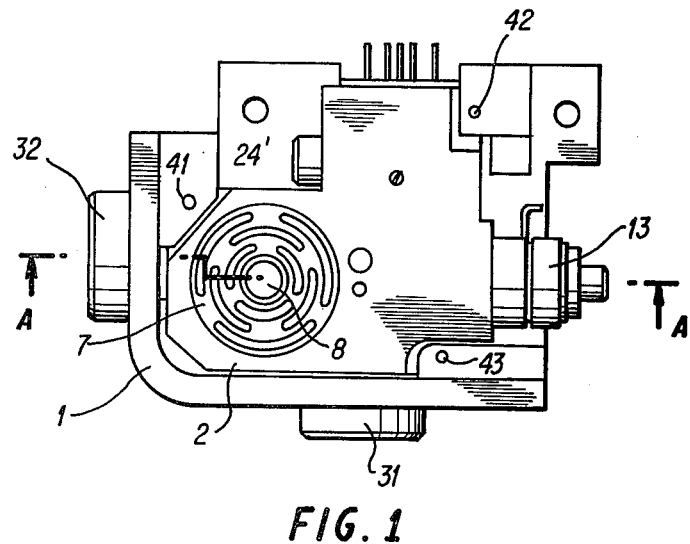
FIG. 1 is an elevational view of the pickup device according to the invention.
Figure 2:
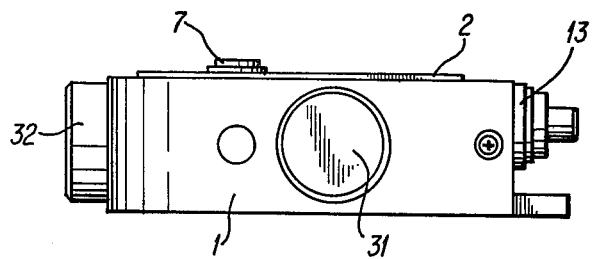
FIG. 2 is a side view of the pickup device shown in FIG. 1.
Figure 3:
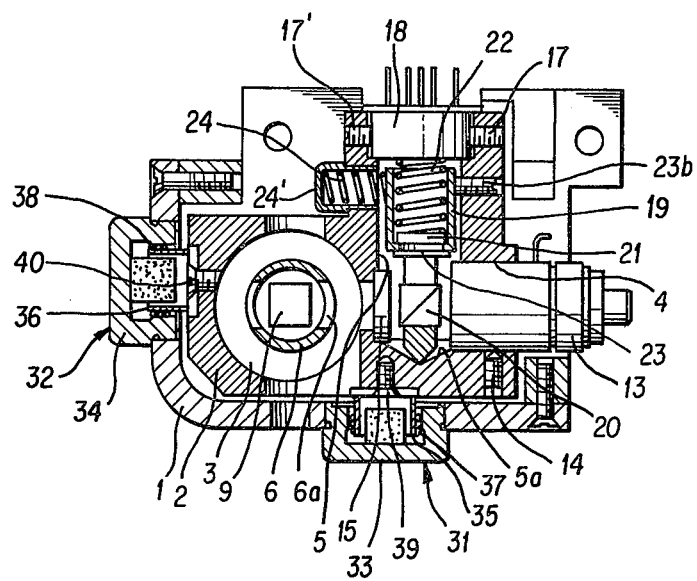
FIG. 3 is a transverse cross-sectional view of the pickup device shown in FIG. 1.
Figure 4:
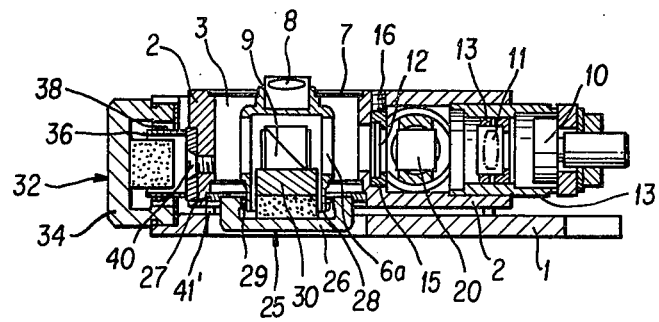
FIG. 4 is a cross-sectional view of the pickup device taken along the lines A—A' in FIG. 1.
Figure 10:
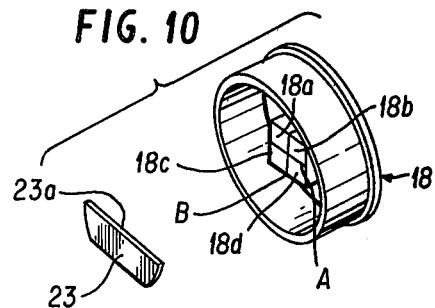
FIG. 10 is a perspective view showing the positional relation between a photo-sensitive diode and a blocking element.

With reference to FIGS. 1 and 10, designated by the reference numeral 1 is a base mount upon which a frame (2) is elastically supported in such a manner as described later in detail. This frame (2) is made of single block of for example metal and formed with a comparatively large through bore (3) which extends vertically, a first horizontal bore (4) which extends in the longitudinal direction of the frame (2) and meets with the through bore (3) at its one end, and a second horizontal bore (5) which extends in transverse relationship with the first horizontal bore (4).

A cylindrical support (6) is resiliently suspended within the through bore (3) by upper and lower diaphragms (7) arranged around the cylindrical support (6) in engagement with the inner side of the through bore (3). The cylindrical support (6) is hollow and formed with opposing cutouts (6a) on its lateral sides to lead a light beam from a beam generating means described later. Further, the upper portion of the cylindrical support (6) mounts a focussing lens (8) which is schematically represented by a single lens. This focussing lens (8) is adapted to bring the light beam into focus on the plane of the disc-shaped information carrier (not shown) to read the information recorded on it. Below the focussing lens (8), a deflecting mirror (9) is positioned in alignment with the focussing lens (8) within the cyclindrical support (6).

Figure 5:
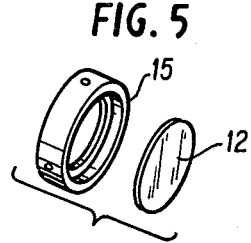
FIG. 5 is an exploded view of a ¼ wave plate and a ring for securing the ¼ wave plate used in the pickup device according to the invention.

Arranged within the first horizontal bore (4) are a beam generating means (10), a coupling lens (11) and a ¼ wave plate (12). The beam generating means (10) may consist for example of a semiconductor laser or a light emitting diode (LED). This beam generating means (10) is arranged at the outward end of the first horizontal bore (4) by means of a sleeve (13). This sleeve (13) is secured within the first horizontal bore (4) by a fixing screw (14) and further holds the coupling lens (11) in the path of the light beam emitted by the beam generating means (10). At the other end portion opening into the through bore (3) the ¼ wave plate (12) is provided and secured in position by way of a ring (15) as shown in FIG. 5 and a fixing screw (16). These elements (10) (11) (12) are adjustable in their rotational direction and/or in the direction of the path of the beam by loosening each fixing screw (14) or (16).

Figure 6:
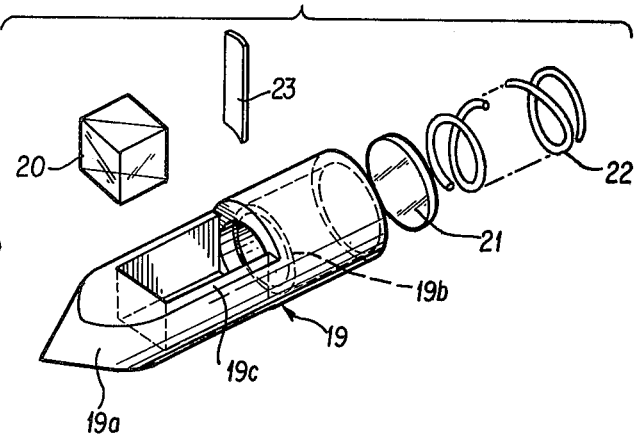
FIG. 6 is an exploded view of a cylindrical holder and optical elements housed therein which are incorporated in the pickup device according to the invention.

The second horizontal bore (5) intersects with the first horizontal bore (4) at a right angle. At the outward end of the bore (5), there is fixed by screws (17, 17') a photo-sensitive detector (18) adapted to receive the light beam and supply electrical signals to the conventional electrical control and readout systems. The photo-sensitive detector (18) consists of the differential photo diode divided into four portions. Further, a cylindrical holder (19) is inserted. This cylindrical holder (19), which is more clearly shown in FIG. 6, has a tapering end (19a) which is in contact with a conical end (5a) of the second horizontal bore (5). The tapering end (19a) is formed to make it easy to set the cylindrical holder (19) in its position within the second horizontal bore (5) and to adjust its position within the second horizontal bore (5) when set in it. The cylindrical holder (19) is also provided with a longitudinal bore (19b) whose inner end opens on the opposed sides of the cylindrical holder (19) through cutouts (19c) formed on the middle section of the holder (19). In the cutout portion of the cylindrical holder (19) a deflecting beam splitter (20) is placed in alignment with the deflecting mirror (9) and the ¼ wave plate (12) and, at the middle section of the longitudinal bore (19b), there is provided a lens (21) for shortening the path of the incoming light beam from the deflecting beam splitter (20). This lens is under the influence of a coil spring (22) which is positioned between the lens (21) and the photo-sensitive detector (18). Further, an element (23) is arranged between the lens (21) and the deflecting light beam splitter (20) to block a part of the beam incident upon the photo-sensitive detector (18) through the lens (21). The cylinder holder (19) is forced into contact with the conical end (5a) of the second horizontal bore (5) by the action of the above-mentioned coil spring (22) and secured in place by a screw (23b) and a spring (24) which are arranged diametrically opposed around the end of the holder (19). The spring (24) is disposed within a spring cup (24') formed on the frame (2) and another set of spring and screw is arranged crosswise in the same manner. With this arrangement, the directions of the light beam incident upon the photo-sensitive detector (18) via the deflecting beam splitter (20), the blocking element (23) and the lens (21) can be adjusted by advancing or retracting the screw (23b).

In the lower end of the through bore (3) an electro-magnetic controlling means (25) is arranged to operate the focussing lens (8) in the upward and downward directions in relation to the disc-shaped information carrier (not shown). The electro-magnetic controlling means (25) is constituted by a cup-shaped magnet (26) supported in vertical alignment with the cylindrical support (6) through the intermediary of a plate (27), a bobbin (28) formed by the bottom end of the cylindrical support (6) extending within the cup-shaped magnet (26) and a solenoid (29) arranged around the bobbin (28).

The above-mentioned deflecting mirror (9) is attached on a mounting block (30) surmounted on the magnet (26). Accordingly, the focussing lens (8) is controlled by the electro-magnetic controlling means (25) independently of the deflecting mirror and the latter is not affected by the upward and downward movements of the focussing lens (8). The mounting block (30) may be fixed on the frame (2) through one of the cutouts to hold the deflecting mirror (9).

Figure 7:
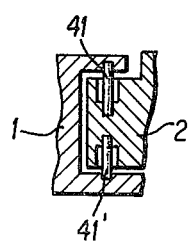
FIG. 7 is a cross-sectional view showing the suspension structure of a frame of the pickup device according to the invention.
Figure 8:
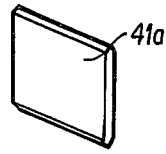
FIG. 8 is a perspective view of the rubber plate used for the suspension structure of the frame.

Further electro-magnetic controlling means of the similar construction (31,32) are provided on the sides of the frame (2) for the purposes described below. For these two controlling means (31,32), a constituent magnet (33,34) is fixed on the lateral of the base mount (1), and a bobbin (35, 36) around which a solenoid (37,38) is arranged is secured on the frame (2) by a fixing screw (39,40). One of these two controlling means (32) has an operating axis in parallel to the beam axis of the light beam incident on the deflecting mirror (9) and the other controlling means (33) has an axis right-angled to that of the controlling means (32). The frame (2) is supported on the base mount (1) by way of the resilient suspension provided in three corners (41,42,43) of the frame (2) as shown in FIG. 1. The structure of such resilient suspension is shown in an enlarged scale in FIG. 7. This shows the suspension structure in the upper corner on the left hand side of the frame (2). As shown, the end portion of the frame (2) is placed between the upper extension and the base portion of the base mount (1), and the frame (2) is held in suspension by means of two upper and lower pins (41,41') inserted into the holes of the frame and the base mount (1). These pins are made of rubber or the like material having similar elasticity. In this first embodiment, the tracking and jitter controls are effected by moving the frame (2) in two different directions on the same plane. Namely, for the jitter control, the frame (2) in resilient suspension is moved by the electro-magnetic controlling means (32) in the direction in parallel with the beam axis of the light beam incident upon the deflecting mirror (9), and the tracking control is made by the electro-magnetic controlling means (31) by moving the frame (2) in the direction transverse with the movements of the frame (2) for the jitter control. The jitter control may be carried out by means of the known electrical circuits. In this case, the control of the frame (2) in two directions is not required and therefore an elastic plate (41a), as shown in FIG. 8, may be used for suspension of the frame (2) instead of the pins (41,41'). Further, in this first embodiment, the two electro-magnetic controlling means (31,32) are placed at a distance from the longitudinal and transverse center axes of the frame (2), respectively. This arrangement is for the purpose of exerting controlling movements on the frame (2) in line with the center of gravity of the latter without causing the undesired rotational movement to the frame (2).

Figure 9:
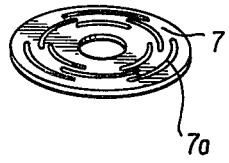
FIG. 9 is an enlarged perspective view of the diaphragm used in the pickup device according to the invention.

The diaphragms (7) used in this embodiment is of a metal plate and produced by way of stamping or etching process. As shown in FIG. 9, the diaphragm is formed with a series of longitudinal openings (7a) in three-fold manner, so that it may have an adequate elasticity to support the cylindrical support (6) for focussing control.

FIG. 10 shows the positional relationship between the photo-sensitive detector (18) and the blocking element (23). As mentioned above, the photo-sensitive detector (18) includes a differential diode divided into four portions (18a,18b,18c,18d) and the blocking element (23) has a beam cutting edge (23a). The beam cutting edge (23a) is in parallel with one of the dividing lines (A,B) by which the differential photo diode is divided into the four portions. In this embodiment, the beam cutting edge (23a) is parallel to the horizontal dividing line (A) and therefore the light beam incident upon the photo-sensitive diode is horizontally cut in part.

Figure 11:
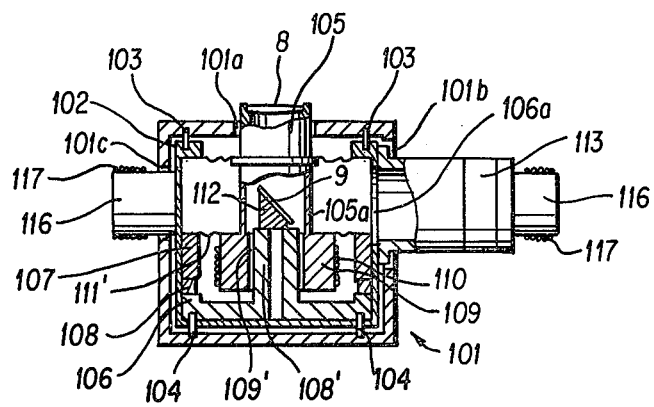
FIG. 11 is a sectional view of the second embodiment of the pickup device according to the invention.

FIG. 11 shows the second embodiment of the pickup device according to the present invention. The base mount (101) is generally in the shape of box and formed with an opening (101a) in the upper side thereof. In this base mount (101), the frame (102) is disposed and movably supported therein by means of the upper and lower rubber pins (103,104). The upper side of the frame (102) is cut out and opens to the opening (101a) of the base mount (101). Within this frame (102), there is arranged the cylindrical support (105) whose upper portion extends upwardly through the opening (101a) to support the focussing lens (8).

At the bottom of the frame (102), the electromagnetic controlling means is disposed for the purpose of the focussing control. This electro-magnetic controlling means comprises first and second magnetic yokes (106,107), a circular magnet (108) interposed between the yokes (106,107), bobbin (109) and a solenoid (110) which is wound around the outer surface of the bobbin (109). The first and second yokes (106,107) and the circular magnet (108) are firmly secured on the inner walls of the frame (102). The bobbin (109) is integrally attached on the lower end of the cylindrical support (105). As shown, the cylindrical support (105) and the bobbin (109) are together suspended within the frame (102) by the upper and lower diaphragms (111,111') and, when the electro-magnetic controlling means is operated, the cylindrical support (105) is moved in upper and lower directions to make the desired focussing control. The above-mentioned magnetic yoke (106) has a center projection (108') which extends upwardly through the inner opening (109') of the bobbin (109) and at the top of the center projection (108') the deflecting mirror (9) is fixed at an angle of 45 through the intermediary of the mounting block (112). Accordingly, the deflecting mirror (9) is not affected by the upward and downward movements of the cylindrical support (105).

The cylindrical support (105) is further provided with a cutout (105a) on the side thereof and in alignment with this cutout (105a) an opening (106a) is formed on the side of the frame (102). In line with these, further, a cylindrical extension (113) extending through the opening (101b) of the base mount (101) fixed on the lateral of the frame (102). This cylindrical extension (113) is in the shape of "T" and accommodates therein the beam generating means (10), the deflecting beam splitter (20), the photo-sensitive detector (19) and the other optical elements mentioned in relation to the first embodiment according to the invention. The cutout (105a) and the opening (106a) are formed to provide the way of the light beam incident upon the deflecting mirror (9) and the returning light beam after the reflection at the surface of the information carrier (not shown).

Figure 12:
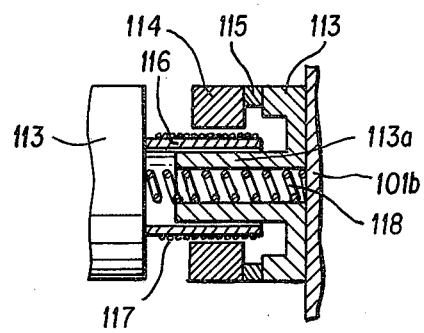
FIG. 12 is a detailed view of the electro-magnetic controlling means.

In this embodiment, there are arranged two electro-magnetic controlling means for the tracking control. One is at the extreme end of the cylindrical extension (113) and the other is on the lateral side of the frame (102) opposite to the cylindrical extension (113). For this purpose, further additional opening (101c) is formed on the base mount (101). The construction of these controlling means are shown in FIG. 12. The first and second magnetic yokes (113,114) are fixed on a part of the base mount (101b) together with the circular magnet (115), and the bobbin (116) is formed on the end of the cylindrical extension (113). This bobbin (116) may also be made by the end of the cylindrical extension (113). The solenoid is shown by the reference numeral 117. A coil spring (118) is disposed in contact with the base mount (116b) and the end of the cylindrical extension (113) to support the frame (102) in its position within the box of the base mount (101) but this may be omitted. If desired, this spring may be used instead of the rubber pins (103,104) to support the frame (102).

Figure 13:
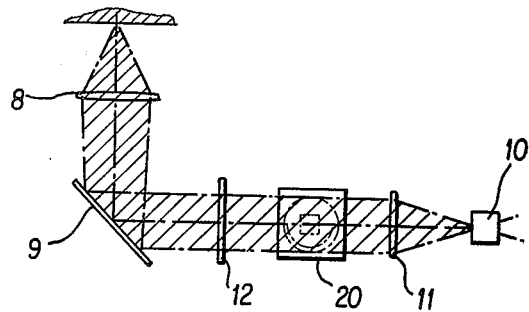
FIG. 13 is a schematic horizontal view showing the optical system of the pickup device.
Figure 14:
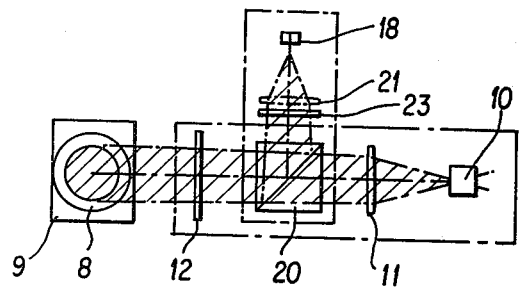
FIG. 14 is a schematic elevational view showing the optical system of the pickup device.

Hereinafter, the optical systems of the present embodiments will be described with reference to FIGS. 13 and 14. A light beam generated by the beam generating means (10) is firstly adjusted by the coupling lens (11) in relation to the focussing lens (8) and travels through the deflecting beam splitter (20) and the ¼ wave plate (12). Then the light beam is deflected in the vertical (upward) direction by the deflecting mirror (9) and converged into a minute spot on the surface of the disc-shaped information carrier through the focussing lens (8). The light beam reflects at the surface of the information carrier and returns through the focussing lens (8) and the deflecting mirror (9). The returning light beam traverses the ¼ wave plate (12) for a second time and impinges on the deflecting beam splitter (20). The direction of the polarization of the returning light beam is further rotated by the ¼ wave plate (12) and at the deflecting beam splitter (20) all the parts of the returning light beam are deflected at a right angle toward the photo-sensitive detector (18). The path of the light beam incident upon the photo-sensitive detector (18) includes the blocking element (23) and the lens (21). A further lens may be disposed between the deflecting beam splitter (20) and the photo-sensitive detector (18) to shorten the path of the light beam therebetween.

The light beam lit on the disc-shaped information carrier is modulated at the plane on which information to be read out is recorded and the returning light beam thus modulated conveys the information to the photo-sensitive detector (18). The photo-sensitive detector detects the information by the variation of the total energy of the light beam falling on the photo-sensitive diode divided into four portions. The derived readout information is thereby changed into electrical signals which are supplied to the known readout apparatus.

When the information carrier is rotated, the distance between the information carrier and the focussing lens (8) changes and also the beam spot deviates from the information track to be read due to for example the eccentricity of rotation of the information carrier. As mentioned above, the focussing control to keep the beam spot constant on the information carrier is effected by the electro-magnetic controlling means (25). The upward or downward displacement of the information carrier, when occurred, causes an unbalance between the energy of the light beam which the two portions (18a,18b) of the photo-sensitive diode receive and the energy of the light beam which the other two portions (18c,18c) receive. Such unbalance of the energy is changed into electrical signals by the photo-sensitive detector (18) to drive the electro-magnetic controlling means (25).

To the contrary, the controlling signals for tracking by way of the electro-magnetic controlling means (31) are obtained by the comparison between the energy of the light beam detected by the two portions (18a,18c) vertically aligned and that detected by the other two portions (18b,18d). The signals of the jitter control by way of the electro-magnetic controlling means (32) is electrically derived from the above-mentioned readout information. The electric circuits interposed between the photo-sensitive diode (18) and each electro-magnetic controlling means (25,31,32) are well known in the art and omitted herein While the invention has been particularly shown and described with reference to preferred embodiments thereof, it will be understood by those skilled in the art that the foregoing and other changes in form and details can be made therein without departing from the spirit and scope of the invention. For example, in these two embodiments, a single light beam is projected on the information carrier. However, the present invention is not limited to the optical system of this structure. There is known another different optical system in which three spots of the light beam are projected onto the plane of the information carrier by additionally using a grating. The optical system of such structure may also be incorporated in the pickup device according to the present invention.

What is claimed is:

1. A pickup device for use in an apparatus for reading video and/or audio information recorded in an optically readable structure on an information carrier, comprising:
   a resiliently supported frame having a cylindrical hollow support,
   a beam generating means for generating a light beam,
   a focussing lens disposed in an upper portion of the cylindrical hollow support to focus the light beam generated by the beam generating means into a beam spot on the surface of the information carrier,
   a first electro-magnetic controlling means arranged under the cylindrical hollow support for moving the cylindrical support upwardly and downwardly to control the size of the beam spot formed on the surface of the information carrier through the focussing lens,
   a beam deflecting mirror fixedly mounted on said frame within said cylindrical hollow support independently of said cylindrical hollow support in vertical alignment with the focussing lens between the latter and the first electro-magnetic controlling means to deflect the light beam from the beam generating means toward the focussing lens,
   a second electro-magnetic controlling means for laterally displacing the frame to control the place of the beam spot on the surface of the information carrier, and
   a photo-sensitive detector for converting the returning light beam after reflection at the surface of the information carrier into electrical signals.

2. A pickup device according to claim 1 in which said frame is provided with a vertical bore within which said cylindrical hollow support is held in resilient suspension and wherein said first electro-magnetic controlling means is arranged in vertical alignment with said cylindrical hollow support.

3. A pickup device according to claim 2 in which said cylindrical hollow support is formed with a cutout on the lateral side thereof in front of said beam deflecting mirror and wherein said deflecting mirror is held within said cylindrical hollow support in fixed positional relation with said beam generating means.

4. A pickup device according to claim 3 in which said second electro-magnetic controlling means is arranged on the side of said frame to exert the horizontal movements thereon in parallel to the beam axis of the light beam incident on said deflecting mirror.

5. A pickup device according to claim 4 in which there is arranged a base mount on which said frame is movably supported.

6. A pickup device according to claim 5 in which said second electro-magnetic controlling means comprises a magnet fixed on the base mount and a bobbin around which a solenoid is wound fixed on said frame.

7. A pickup device according to claim 6 in which said frame is supported on said base mount by means of elastic members arranged between said frame and said base mount and is movable in a direction perpendicular to the movements of the said cylindrical hollow support which is driven by said first electro-magnetic controlling means.

8. A pickup device according to claim 7 in which said elastic members comprise rubber.

9. A pickup device according to claim 8 in which said elastic members comprise rubber pins which are arranged on the upper and lower sides of said frame and wherein one end of each said rubber pin is fixed on said base mount and the other end is fixed on said frame.

10. A pickup device according to claim 7 in which said cylindrical hollow support is supported in suspension by a resilient element arranged around said cylindrical hollow support.

11. A pickup device according to claim 10 in which said first electro-magnetic controlling means comprises a magnet and a bobbin around which a solenoid is arranged and wherein said bobbin is formed integrally on the lower portion of said cylindrical hollow support.

12. A pickup device according to claim 11 in which said resilient element is arranged in the upper and lower portions of said cylindrical hollow support.

13. A pickup device according to claim 12 in which said magnet of said first electro-magnetic controlling means is fixed on the bottom of the frame.

14. A pickup device according to claim 13 in which said resilient element comprises a diaphragm.

15. A pickup device according to claim 14 in which said diaphragm is made of metal.

16. A pickup device according to claim 13 in which said deflecting mirror is disposed above said magnet of said first electro-magnetic controlling means through the intermediary of a mounting block.

17. A pickup device according to claim 16 in which said beam generating means is provided on said frame in line with said beam deflecting mirror and said cutout formed on the lateral side of said frame.

18. A pickup device according to claim 17 in which between said beam deflecting mirror and said beam generating means there is arranged a deflecting beam splitter to direct the returning light beam toward said photo-sensitive detector.

19. A pickup device according to claim 18 in which said photo-sensitive detector is arranged on said frame and wherein said deflecting beam splitter is held in the path of the returning light beam by means of a cylindrical holder which is fixed on the frame by springs and screws arranged around said cylindrical holder crosswise in the diametrically opposed relationship.

20. A pickup device according to claim 19 in which said cylindrical holder has a tapered end to engage with a corresponding conical depression formed on the frame.

21. A pickup device according to claim 20 in which said frame has a first horizontal bore which extends from the side of said vertical bore and a second horizontal bore which traverses said first horizontal bore and wherein said beam generating means is positioned at an opening end of one of said horizontal bores and wherein said photo-sensitive detector is disposed at an opening end of the other horizontal bore.

22. A pickup device according to claim 21 in which said photo-sensitive detector is disposed at the opening end of said second horizontal bore and wherein said cylindrical holder is held within said second horizontal bore under the influence of a spring disposed between the photo-sensitive detector and said cylindrical holder.

23. A pickup device according to claim 22 in which said cylindrical holder is provided with a longitudinal bore which opens into cutouts formed on the opposed sides of the cylindrical holder and wherein said deflecting beam splitter is positioned at a portion of said cutouts to direct the returning light beam through the longitudinal bore toward said photo-sensitive detector.

24. A pickup device according to claim 23 comprising a lens is arranged between said photo-sensitive detector and said deflecting beam splitter to shorten the path of the returning light beam toward said photo-sensitive detector.

25. A pickup device according to claim 24 comprising a quarter wavelength plate positioned in the path of the light beam between said beam generating means and said deflecting mirror and wherein said deflecting beam splitter is arranged in alignment with said quarter wavelength plate.

26. A pickup device according to claim 25 in which a third electro-magnetic controlling means is arranged on said side of said base mount to have said frame horizontally for jitter control.

* * * * *